United States Patent [19]

Nagano

[11] Patent Number: 4,635,759
[45] Date of Patent: Jan. 13, 1987

[54] CALIPER BRAKE FOR A BICYCLE

[75] Inventor: Masashi Nagano, Izumi, Japan

[73] Assignee: Shimano Industrial Company Limited, Osaka, Japan

[21] Appl. No.: 723,905

[22] Filed: Apr. 16, 1985

[30] Foreign Application Priority Data

Apr. 24, 1984 [JP] Japan .................. 59-60240[U]

[51] Int. Cl.$^4$ ............................................. B62L 1/12
[52] U.S. Cl. ................................. 188/24.22; 384/607
[58] Field of Search ............. 188/24.11, 24.12, 24.13, 188/24.14, 24.15, 24.16, 24.19, 24.21, 24.22; 384/604, 607, 608; 308/DIG. 8

[56] References Cited

U.S. PATENT DOCUMENTS

| | | | |
|---|---|---|---|
| 1,435,167 | 11/1922 | Loeffler | 384/608 |
| 3,414,341 | 12/1968 | Murphy | 384/607 X |
| 4,151,897 | 5/1979 | Schoch | 188/24.19 |
| 4,162,110 | 7/1979 | Gardella | 384/607 X |
| 4,308,153 | 12/1981 | Mori | 308/DIG. 8 |

FOREIGN PATENT DOCUMENTS 56-36700  8/1981  Japan .

*Primary Examiner*—Duane A. Reger
*Assistant Examiner*—Richard R. Diefendorf
*Attorney, Agent, or Firm*—Stevens, Davis, Miller & Mosher

[57] ABSTRACT

A bicycle caliper brake is provided which includes a pair of brake arms each having a brake shoe on one end thereof. A support bolt supports the brake arms rotatably relative to each other. The brake arms each have a boss with a throughbore by which the brake arms are fitted onto the bolt. The bosses are supported on the bolt adjacent to each other. A thrust bearing is interposed between opposite surfaces of the bosses, and a sealing element is disposed at an outer periphery of the thrust bearing between the opposite surfaces of the bosses.

10 Claims, 13 Drawing Figures

CALIPER BRAKE FOR A BICYCLE

FIELD OF THE INVENTION

This invention relates to a caliper brake for a bicycle, and more particularly, to a caliper brake for a bicycle, which includes a pair of brake arms each having a brake shoe and each having a boss by which it is supported rotatably relative to each other onto a support bolt fixed to the bicycle frame or a stationary member fixed thereto so that the brake arms can be moved in swinging motion primarily by operating a control wire, thereby bringing the brake shoes into press-contact with a wheel rim for exerting braking action on the bicycle.

BACKGROUND OF THE INVENTION

Generally, bicycle caliper brakes include a pair of brake arms which carry at their utmost ends brake shoes and which are fitted at bosses onto a support bolt; an adjusting nut and a lock nut screw with the utmost end of the support bolt, so that the brake arms are adapted to be rotatable relative to each other.

When the bosses of the brake arms abut directly against each other, frictional resistance between the bosses becomes large, thus hindering smooth relative rotation of each brake arm and reliable braking action.

Accordingly, a caliper brake has hitherto been proposed which interposes a hard washer between the opposite surfaces of the brake arms so as to effect smooth relative rotation of each brake arm as described in Japanese Utility Model Publication Gazetta No. Sho 56-36,700. This caliper brake, however, creates difficulties in adjusting the adjusting nut because the brake arms are supported and tightened on the support bolt through the adjusting nut and a lock nut; the adjusting nut may be tightened excessively and cause larger frictional resistance between the washer and the bosses. As a result, smooth relative rotation of each brake arm may be difficult.

When the caliper brake exerts the braking action, the brake shoes make contact with the wheel rim and the rotation of the wheel acts on each brake arm through the wheel rim and the brake shoes so that the brake arms are biased axially of the support bolt to apply a scooping force onto the support portion of each brake arm at which the brake arms are supported on the support bolt. Hence, the washer used as above-mentioned is subjected to an excessive unbalanced load, thereby creating a problem in that the abutting surfaces between the washer and each brake arm cause not only one-sided wearing but also a seizure, thus resulting in rapid deterioration of the rotational efficiency of each brake arm.

Even when the adjusting nut is well adjusted to smooth the relative rotation of each brake arm, rain water or dust can enter between the opposite surfaces of the bosses at the brake arms, thereby also creating a problem in that the rotational resistance of each brake arm increases, also resulting in rapid deterioration of the rotational efficiency thereof.

SUMMARY OF THE INVENTION

In light of the above problems, this invention has been designed. An object of the invention is to provide a caliper brake in which a thrust bearing is interposed between the opposite surfaces of the bosses at the brake arms and which includes at the outer periphery of the thrust bearing a sealing means therefor; thus, even when the adjusting nut is tightened excessively or the support portion of each brake arm by which the brake arms are supported to the support bolt is subjected to a scooping force, the brake arms can smoothly rotate relative to each other to exert the braking action. Also, rain water or dust is prevented from entering into the thrust bearing.

The above and further objects and novel features of the invention will be more fully apparent from the following detailed description when the same is read in connection with the accompanying drawings.

DETAILED DESCRIPTION OF THE INVENTION

Figure 1:
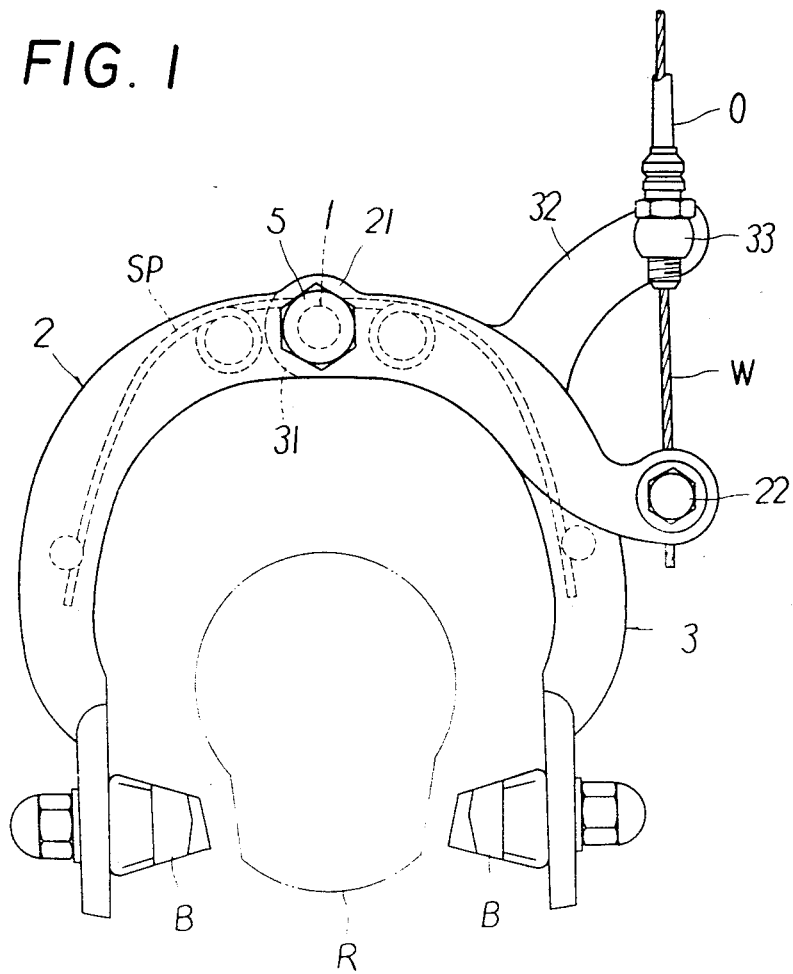
FIG. 1 is a front view of an embodiment of a caliper brake of the invention.
Figure 2:
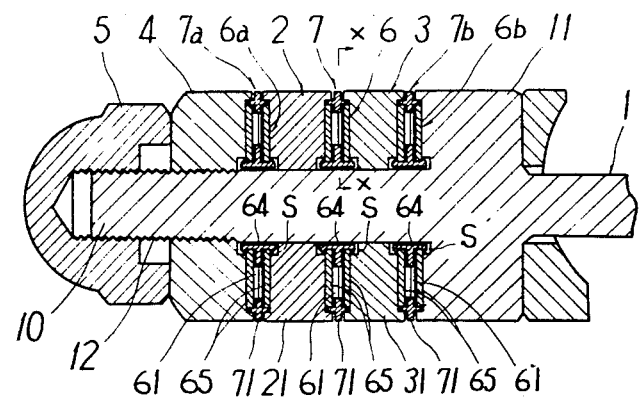
FIG. 2 is a longitudinal sectional view of the FIG. 1 embodiment.

Referring to FIG. 1, a side-pull type caliper brake is shown in which a first brake arm 2 having a C-like shape and a second brake arm 3 having a Y-like shape are supported rotatably relative to each other onto a support bolt 1 fixed to the bicycle frame or a stationary member fixed thereto. The support bolt 1, as shown in FIG. 2, has a swollen portion 11 at a lengthwise intermediate portion and a shaft 10 extending from one side of swollen portion 11. Shaft 10 has a screw thread 12 at its utmost end. First brake arm 2 has at its intermediate portion a boss 21 and second brake arm 3 has at one end a boss 31, the bosses 21 and 31 having through bores to be fitted onto the shaft 10, thereby being supported on shift 10 adjacent to each other.

The screw thread 12 screws with an adjusting nut 4 and a lock nut 5 to support the brake arms 2 and 3 onto the support bolt 1 rotatably relative to each other.

The brake arms 2 and 3 are provided at one of their ends with brake shoes B to abut against the wheel rim R and are biased outwardly by a spring SP respectively.

Also, the first brake arm 2 has at its other end a holder 22 for a control wire W, the second brake arm 3 being provided at a lengthwise intermediate portion with a branch 32 having at its end a holder 33 for an outer sheath O for guiding the control wire W so that the wire W is pulled to allow the brake arms 2 and 3 to rotate relative to each other.

In the caliper brake shown in FIGS. 1 through 4, thrust bearing 6 and sealing means 7 are interposed between the opposite surfaces of bosses 21 and 31 at the brake arms 2 and 3. Sealing means 7 is disposed at the outer periphery of thrust bearing 6.

Specifically, the opposite surfaces of bosses 21 and 31 are recessed in part to form a space S therebetween so that the thrust bearing 6 is contained therein.

The thrust bearing 6 comprises a plurality of rolling elements 61 of rollers disposed circumferentially and a synthetic resin retainer 64 having at its radially intermediate portion holding portions 62 for the rollers 61 and grooves 63 formed at both axial sides of holding portions 62 respectively. The retainer 64 is interposed in the space S and mounted on the outer periphery of shaft 10 at the bolt 1, and ring-like-shaped washers 65 of wear-resistant material are held in the grooves 63, spaced at predetermined intervals, and abut against opposite surfaces of bosses 21 and 31 respectively. The rollers 61 are held at the holding portions 62 and are sandwiched between the washers 65. Rollers 61 are oriented radially of the retainer 64 and are spaced circumferentially thereof at regular intervals. Washers 65 and rollers 61 are combined as a unit around the retainer 64. In addition, the thrust bearing 6 need not be in unitary form.

Thus, the rollers 61 roll between the washers 65 to allow the brake arms 2 and 3 to smoothly rotate relative to each other.

Although rollers 61 may be interposed directly between the opposite surfaces of bosses 21 and 31, brake arms 2 and 3 usually are formed of an aluminum alloy or the like so that the rollers 61, if interposed directly between the brake arms, will create indentations on the opposite surfaces of bosses 21 and 31 to thereby develop the risk of hindering smooth rolling of each roller 61. Hence, this embodiment uses the rollers 61 and washers 65 combined in unitary form for carrying out smooth rolling of each roller 61.

Between the opposite surfaces of bosses 21 and 31 and at the outer periphery of thrust bearing 6 is provided a sealing means 7 to seal the thrust bearing 6, thereby preventing rain water or dust from entering therein.

Figure 3:
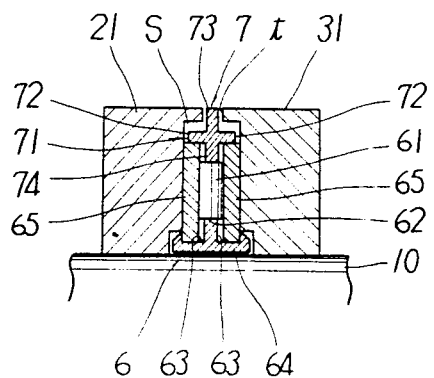
FIG. 3 is an enlarged sectional view of the principal portion of the same.
Figure 4:
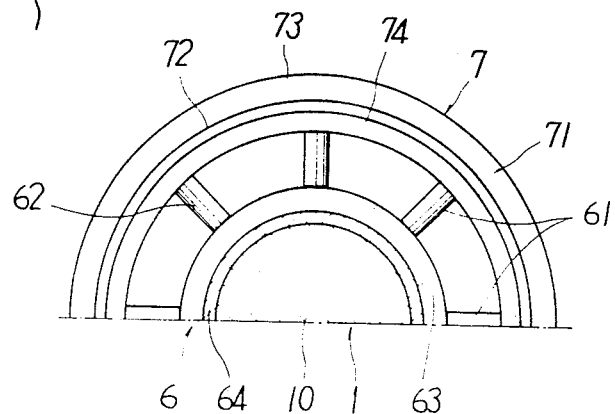
FIG. 4 is a sectional view taken on the line X—X in FIG. 2.

The sealing means 7, as shown in FIG. 3, is formed of a synthetic resin ring 71, for example, cross-shaped in section. In detail, the sealing means 71 comprises holders 72 provided at both axial sides and abutting against the outer peripheries of washers 65, a projection 73 projecting radially outwardly from the ring 71 and closing a gap t between the opposite surfaces of bosses 21 and 31 and at the outer peripheral side of space $S_1$, and a support 74 projecting radially inwardly of ring 71 and abutting against the outer end of each roller 61. Sealing means 7 is interposed in the space S at the outer peripheral side thereof to thereby seal the thrust bearing 6.

Figure 5:
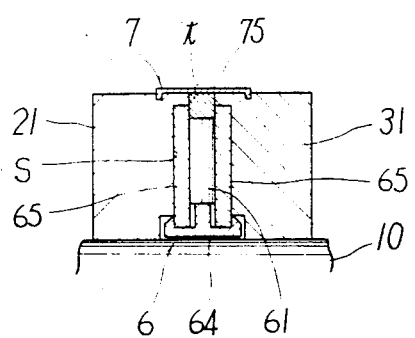
FIGS. 5 through 8 are sectional views exemplary of various sealing means used for the caliper brake in FIG. 1, FIGS. 9 and 10 are views exemplary of an arrangement of thrust bearings in the caliper brake of FIG. 1, FIGS. 11 and 12 are sectional views of modified embodiments of the invention, corresponding to FIG. 2.

Alternatively, the thrust bearing 6 may, as shown in FIG. 5, be sealed in such a manner that a sealing cap 75 of, for example, synthetic resin, partially covers the outer peripheries of bosses 21 and 31 to close the space S for sealing the thrust bearing 6.

Figure 6:
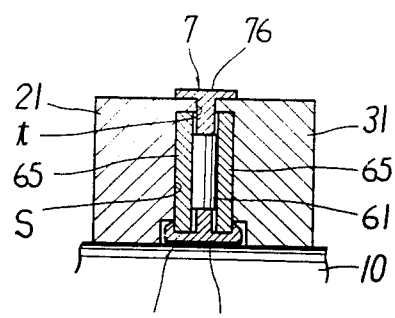

Alternatively, a synthetic resin ring 76 of a T-like shape in section, as shown in FIG. 6, may be inserted inwardly of the space S through the gap t to seal the thrust bearing 6.

Figure 7:
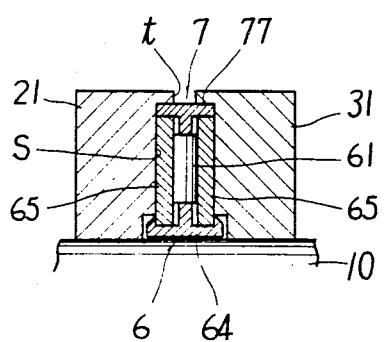

Also, a ring 77 of a T-like shape in section, as shown in FIG. 7, may be inserted within the space S at the outer peripheral side thereof to close the gap t, thereby enabling the thrust bearing 6 to be sealed.

Figure 8:
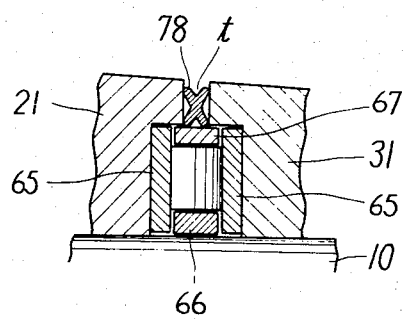

Furthermore, a synthetic resin ring 78 of X-like shape in section, as shown in FIG. 8, may be interposed within the gap t. In this case, for example, an inner ring 66 is provided at the inner end side of each roller 61 and an outer ring 67 is provided at the outer end side of the same.

In the FIG. 2 embodiment, thrust bearings 6a and 6b the same as the thrust bearing 6 are interposed within annular spaces S formed between the first brake arm 2 and the adjusting nut 4 and between the second brake arm 3 and the swollen portion 11 of support bolt 1. Thrust bearings 6a and 6b are provided at their outer peripheries with sealing means 7a and 7b the same as the aforesaid sealing means 7. In addition, the thrust bearings 6a and 6b and sealing means 7a and 7b are basically the same as the thrust bearing 6 and sealing means 7 respectively and are designated by idential reference numerals. No separate detailed description of these elements therefore is provided.

Alternatively, the retainer 64 in the aforesaid respective embodiments may be integral with the sealing means 7 and disposed within the space S at the outer peripheral side thereof.

Figure 9:
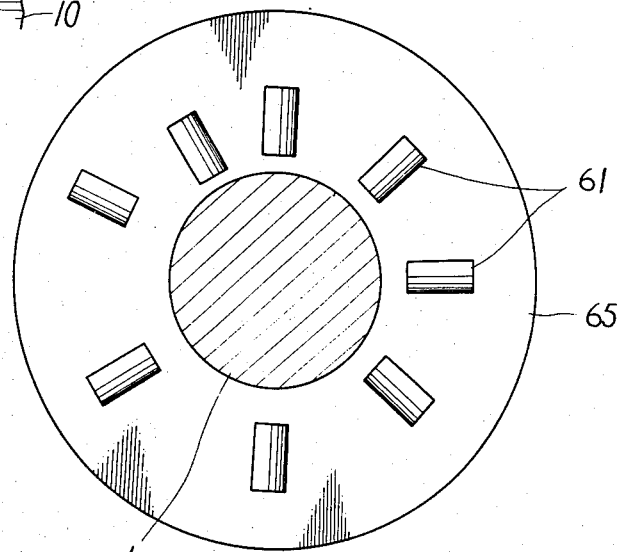

Also, the rollers 61 may, as shown in FIG. 9, be disposed at different distances radially from the support bolt 1, in other words, at radial phase differences, and may be circumferentially spaced at different intervals.

Thus, even when indentations are created by the rollers 61 at the opposite surfaces of the bosses 21 and 31, the boss 21 and adjusting nut 4, and the boss 31 and swollen portion 11, all the rollers 61 do not sink into the same indentation, thereby enabling smooth relative rotation of each roller 61, and in turn of each brake arm 2 or 3.

Figure 10:
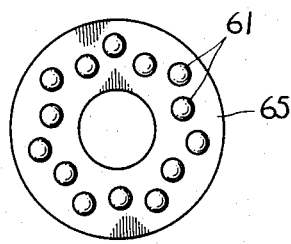

Alternatively, the rolling elememts 61 at the thrust bearings 6, 6a and 6b may, as shown in FIG. 10, use balls 61 instead of the rollers respectively. In this case, the balls 61 are disposed circumferentially and alternately radially shifted respectively, whereby the number of balls 61 can be increased and the thrust load can be received at many points.

Figure 11:
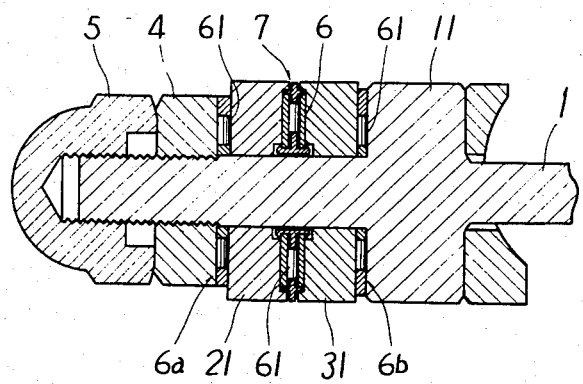

Also, in the aforesaid embodiments, the thrust bearings 6a and 6b and sealing means 7a and 7b are not indispensable, but, when provided as shown in FIG. 2, are useful to improve the rotational efficiency of each brake arm 2 or 3. Alternatively, the thrust bearings comprising rolling elements 61 only may, as shown in FIG. 11, be interposed between the opposite surfaces of the boss 21 and adjusting nut 4 and between those of the boss 31 and swollen portion 11. In this case, inner rings are provided at the inner end sides of the rolling elements 61 and outer rings at the outer end sides of the same.

Figure 12:
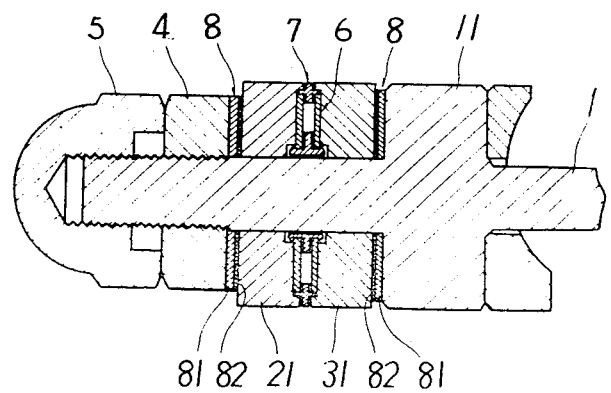

Alternatively, between the opposite surfaces of the boss 21 and adjusting nut 4 and between those of the boss 31 and swollen portion 11, washers 8 instead of the thrust bearings may, as shown in FIG. 12, be interposed respectively. Washers 8 each comprise a base material 81 which is strong enough to withstand surface pressure acting on these opposite surfaces and a slide layer 82 formed of material having a low friction coefficient.

Figure 13:
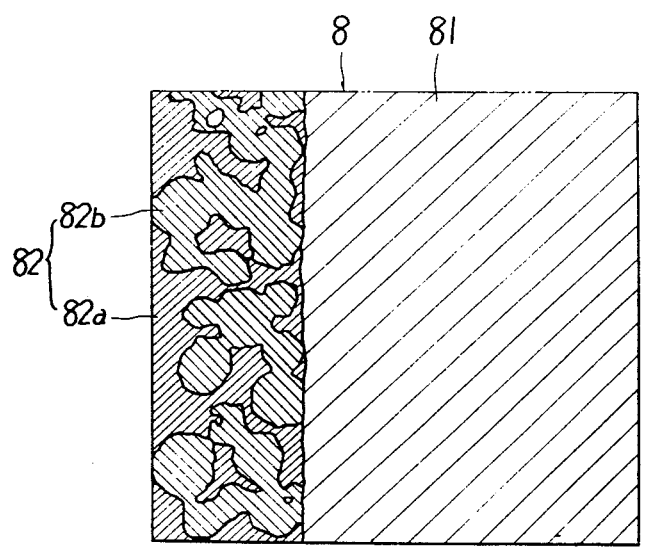
FIG. 13 is an enlarged sectional view of a washer used for the FIG. 12 embodiment.

The washer 8, as shown in FIG. 13, comprises a base material 81, for example, formed of an annular aluminum plate and a slide layer 82 attached to one side surface thereof. Slide layer 82 comprises a porous metal 82a of sintered powder of bronze and a slide material 82b formed of fluororesin mixed with lead and impregnated into the porous sintered metal 82a.

Alternatively, the base material 81 for the washer 8 may use, for example, iron, bakelite or acrylic resin. Also, the slide layer 82 may alternatively not use the sintered metal 82a but may couple the slide material 82b directly with the base material 81. However, the sintered metal 82a impregnated with the slide material 82b, can reliably prevent the slide layer 82 from peeling from the base material 81 even when minute sand particles are caught between the opposite surfaces of slide layer 82 and boss 21 or 31 to thereby scratch the slide layer 82.

Also, the slide layer 82 may alternatively be formed of synthetic resin, such as silicon resin, instead of fluororesin, or may be formed of a sheet, such as a cotton cloth, impregnated with synthetic resin and coupled with the base material 81 by, for example, baking. Accordingly, the material of this sheet is not particularly defined. Also, the slide layer 82 may be provided at both sides of base material 81.

The caliper brake of the invention constructed as above-mentioned, when the braking action is exerted or released, allows the brake arms 2 and 3 to rotate relative to each other on the support bolt 1 and each rolling element 61 at the thrust bearing 6 rolls circumferentially thereof to carry out smooth movement of brake arm 2 or 3. Moreover, between the boss 21 and the adjusting nut 4 and between the boss 31 and the swollen portion 11, bearing members are interposed to enable further enhanced smooth rotation of each brake arm 2 or 3 and reliable braking action. Furthermore, even when the adjusting nut 4 is excessively tightened or the support portion of each brake arm 2 or 3 to the support bolt 1 is subjected to a scooping force, relative rotation between the brake arms 2 and 3 is not hindered and the sealing means seals the thrust bearing to protect it, thereby ensuring smooth relative rotation of each brake arm over a long period of time.

Although several embodiments have been described above, they are merely exemplary of the invention and not to be construed as limiting, the invention being defined solely by the appended claims.

What is claimed is:

1. A caliper brake for a bicycle, comprising:
   (a) a pair of brake arms each having a brake shoe on one end thereof,
   (b) a support bolt for supporting said brake arms rotatably relative to each other, said brake arms each having a boss with a through bore by which said brake arms are fitted onto said bolt, said bosses being supported on said bolt adjacent to each other,
   (c) a thrust bearing disposed between opposite surfaces of said bosses, and
   (d) a sealing means disposed at an outer periphery of said thrust bearing between said opposite surfaces of said bosses,
   (e) said thrust bearing comprising (i) a plurality of rolling elements and a retainer holding said rolling elements, such that said rolling elements and said retainer are interposed between said opposite surfaces of said bosses, each of said bosses comprising a recess forming a space on a side thereof which is disposed opposite to said retainer, and (ii) respective washer means disposed in each said recess such that each washer means is disposed opposite to a respective side of said retainer, whereby said respective washer means and said retainer enclose said rolling elements to cooperate with said sealing means to seal said rolling elements.

2. A caliper brake for a bicycle as set forth in claim 1, further including a pair of washers, said washers being interposed between said thrust bearing and each of said bosses.

3. A caliper brake for a bicycle as set forth in claim 1, wherein said thrust bearing comprises a plurality of rolling elements and a retainer for holding said rolling elements.

4. A caliper brake for a bicycle as set forth in claim 3, wherein said retainer is integral with said sealing means.

5. A caliper brake for a bicycle as set forth in claim 3, wherein said retainer comprises a pair of washers, said washers being respectively interposed between said thrust bearing and each of said bosses.

6. A caliper brake for a bicycle as set forth in claim 3, wherein said retainer includes holding portions for said rolling elements, said holding portions being positioned at different distances radially with respect to an axis of said support bolt, said holding portions supporting said rolling elements respectively.

7. A caliper brake for a bicycle as set forth in claim 6, wherein said holding portions positioned at different distances radially of said support bolt are disposed at said different distances alternately circumferentially of said retainer.

8. A caliper brake for a bicycle as set forth in claim 1, wherein said support bolt has a swollen portion and a shaft extending forwardly of said swollen portion, said shaft comprising a fore end with a screw thread, said caliper brake further comprising an adjusting nut and a lock nut which are screwable with said screw thread and disposed such that said bosses are disposed between said swollen portion and said adjusting nut, one said boss being adjacent to said swollen portion and the other said boss being adjacent to said adjusting nut, and bearing members for receiving thrust loads disposed between said swollen portion and the one said boss and between said adjusting nut and the other said boss.

9. A caliper brake for a bicycle as set forth in claim 8, wherein said bearing members are thrust bearings respectively.

10. A caliper brake for a bicycle as set forth in claim 8, wherein each of said bearing members comprises a washer including a base material and a slide layer disposed on a surface of said base material.

* * * * *